United States Patent [19]
Brix et al.

[11] Patent Number: 5,002,159
[45] Date of Patent: Mar. 26, 1991

[54] DRUM BRAKE IN A MOTOR VEHICLE COMPRISING A PARKING BRAKE WITH DETACHABLY CONNECTED CABLE

[75] Inventors: Herman Brix, Boppard; Eckart Op den Camp, Koblenz, both of Fed. Rep. of Germany

[73] Assignee: Lucas Industries public limited company, Birmingham, England

[21] Appl. No.: 342,134

[22] Filed: Apr. 24, 1989

[51] Int. Cl.$^5$ .................. B60T 7/00; F16D 65/14; F16D 51/00
[52] U.S. Cl. .................. 188/2 D; 188/325; 188/106 A
[58] Field of Search ............ 188/106 A, 106 F, 325, 188/327, 328, 20, 78, 112 R, 326; 29/402.01; 74/502.6, 500.5

[56] References Cited
U.S. PATENT DOCUMENTS

| | | | |
|---|---|---|---|
| 2,140,778 | 12/1938 | White | 188/325 X |
| 3,173,516 | 3/1965 | Rigby | 188/106 AX |
| 4,569,112 | 2/1986 | Dusspult | 188/2 D X |
| 4,753,325 | 6/1988 | Jaksic | 188/325 X |

FOREIGN PATENT DOCUMENTS
8702576 3/1987 Fed. Rep. of Germany.

Primary Examiner—Robert J. Oberleitner
Attorney, Agent, or Firm—Scrivener and Clarke

[57] ABSTRACT

A drum brake in a motor vehicle, comprising a parking brake which includes a brake cable connected detachably to a hand brake lever arranged in the drum brake by the brake cable being passed through a retaining member which is connected to the hand brake lever an engaging behind the retaining member by a nipple of larger cross sectional dimensions connected to the corresponding free end of the brake cable is characterized in that the brake cable (6) is passed through a guide tube (7) which is fixed to the anchor plate (1) of the drum brake, is exposed to the outside of the drum brake, and terminates at a distance ahead of the retaining means (8), the inner diameter of the guide tube (7) being somewhat greater than the maximum outer diameter of the nipple (9), in that the retaining member (8) has a guide path (10) for the nipple (9) extending from its front face (11) which faces the guide tube (7) to its rear face (12), and in that rear face (12) of the retaining member (8) is provided with a locking member (13) for the nipple (9) positioned there.

6 Claims, 2 Drawing Sheets

DRUM BRAKE IN A MOTOR VEHICLE COMPRISING A PARKING BRAKE WITH DETACHABLY CONNECTED CABLE

FIELD OF THE INVENTION

The instant invention relates to a drum brake in a motor vehicle, comprising a parking brake which includes a brake cable connected detachably to a hand brake lever arranged in the drum brake by the brake cable being passed through a retaining means which is connected to the hand brake lever and engaging behind the retaining means by a nipple of larger cross sectional dimensions connected to the corresponding free end of the brake cable.

BACKGROUND OF THE INVENTION

The brake cable of a parking brake usually is connected for detachment to a hand brake lever arranged in the drum brake so that the brake cable can be exchanged. In the common drum brakes the brake cable, when being mounted, is passed through a retaining means connected to the hand brake lever, the brake cable engaging behind the retaining means by a thickened nipple which is attached to one end of the brake cable. With this conventional design of the fastening of the brake the assembly can be accomplished in but one state in which the drum brake is open, i.e. before the brake drum is mounted on the drum brake. This however is contrary to the requirements of expedient motor vehicle assembly according to which finished subassemblies of the components of a motor vehicle are to be supplied to the assembly line in order simply to be installed in the vehicle.

If the brake cable can be mounted only when the drum brake is open either the axles equipped with the drum brakes without the brake drums and the wheel hubs which usually are connected integrally to the same are supplied to the assembly line where, first of all, the brake cables are attached and subsequently the brake drums with the hubs are mounted. As the wheel hubs receive the ball bearings, dirt may enter the bearings with this order of assembly, impairing the proper functioning of the bearings. With a different course of assembly, first the brake cable can be attached in the open drum brake whereupon the drum brake is fitted together with the hub and the brake drum so that this finished unit is ready for supply to the assembly line. This solution has the disadvantage that the handling of the assembly unit is rendered difficult by the flexible, resilient brake cable which is about 2 meters long.

For this reason DE-GM 87 02 576 already suggested a drum brake with an intermediate cable attached to the hand brake lever and leading to the outside of the drum brake. The end of the intermediate cable exposed to the outside of the drum brake is provided with a tension member from which the actual brake cable may be suspended. This design has the advantage of permitting the brake cable to be fastened to the drum brake furnished with the brake drum. Yet this known structure is rather expensive.

SUMMARY OF THE INVENTION

It is, therefore, an object of the instant invention to develop a drum brake of the kind in question such that the brake cable can be fastened to the hand brake lever of the parking brake with the brake drum in assembled state, without requiring the use of an intermediate cable.

This object is met, in accordance with the invention, in that the brake cable is passed through a guide tube which is fixed to the anchor plate of the drum brake, is exposed to the outside of the drum brake, and terminates at a distance ahead of the retaining means, the inner diameter of the guide tube being somewhat greater than the maximum outer diameter of the nipple, that the retaining means has a guide path for the nipple extending from its front face which faces the guide tube to its rear face, and that the rear face of the retaining means is provided with a locking means for the nipple positioned there.

Advantageous further developments of the invention are recited in the subclaims.

The drum brake according to the invention comprises a guide tube which is attached to the anchor plate of the drum brake and terminates at a distance from the retaining means for the brake cable. The other end of the guide tube is exposed toward the outside of the drum brake so that the brake cable can be introduced from that end into the guide tube. To permit that, the guide tube has an inner diameter which is a little bigger than the maximum outside diameter of the nipple which is firmly connected to the brake cable. The retaining means for the brake cable includes a guide path for the nipple, leading from the front face of the retaining means facing the guide tube to the rear face thereof. At the backside of the retaining means a locking means is provided to hold the nipple which is located there in abutment against the retaining means.

With the drum brake according to the invention, therefore, the brake cable can be fastened at the hand brake lever when the drum brake is closed already, i.e. equipped with the brake drum. To accomplish that, the nipple is introduced from outside into the guide tube and pushed forward whereupon the nipple reaches the guide track of the retaining means along which track it is guided to the backside of the retaining means. There the nipple is held in engagement against the rear face of the retaining means by the locking means.

This makes it possible to supply to the assembly line the axle groups including the completely preassambled brake drums. At the assembly line subsequently the brake cables are mounted which were previously attached to the vehicle body.

It is suggested, with particular advantage, that the retaining means for the brake cable be formed by a lower end portion of the hand brake lever bent approximately to U shape, in cross section, the cross sectional planes extending perpendicularly to the longitudinal axis of the brake cable. The marginal edge of the bent end portion should rise in the fashion of a ramp from the front face to the rear face, while the width of the opening of the bent end portion should diminish from the front to the backside. Conveniently the opening converges like a funnel toward the rear face.

According to another proposal of the instant invention the nipple has the configuration of a frustum of a cone having its smaller cross sectional area associated with the free end of the brake cable. With the brake cable fixed in position, the large cross sectional area of the conical frustum thus abuts against the backside of the retaining means.

The opening of the bent end portion should be dimensioned such that the corresponding front end portion of the nipple first may enter into the opening, whereby the nipple is centered in the opening. Upon being advanced further, the nipple rides on the ramp-like marginal edge along which the nipple is guided up to the rear face of the retaining means behind which it finally comes to lie. The brake cable thus passes through the U-shaped retaining means.

It is suggested with particular advantage that the ramp-like marginal edge of the bent end portion rise by such a degree that, in the course of the forward movement of nipple along the marginal edge, the brake cable is pressed against the inside surface of the guide tube. Hereby the brake cable at least is curved a little before the nipple reaches the backside of the retaining means and thus a resilient return force is brought about in the brake cable making the nipple snap down into fastening position behind the backside of the retaining means.

If the ramp-like marginal edge terminates in a rear locking hook, in accordance with another proposal of the invention, this locking hook will project above the nipple, preventing it from getting into release position while the brake cable is in tight condition.

The brake cable may be kept tight at all times by a tension spring arranged between the hand brake lever and the associated brake shoe.

BRIEF DESCRIPTION OF THE DRAWING

The invention will be described further, by way of example, with reference to the accompanying drawings, in which.

DESCRIPTION OF THE PREFERRED EMBODIMENT

Figure 1:
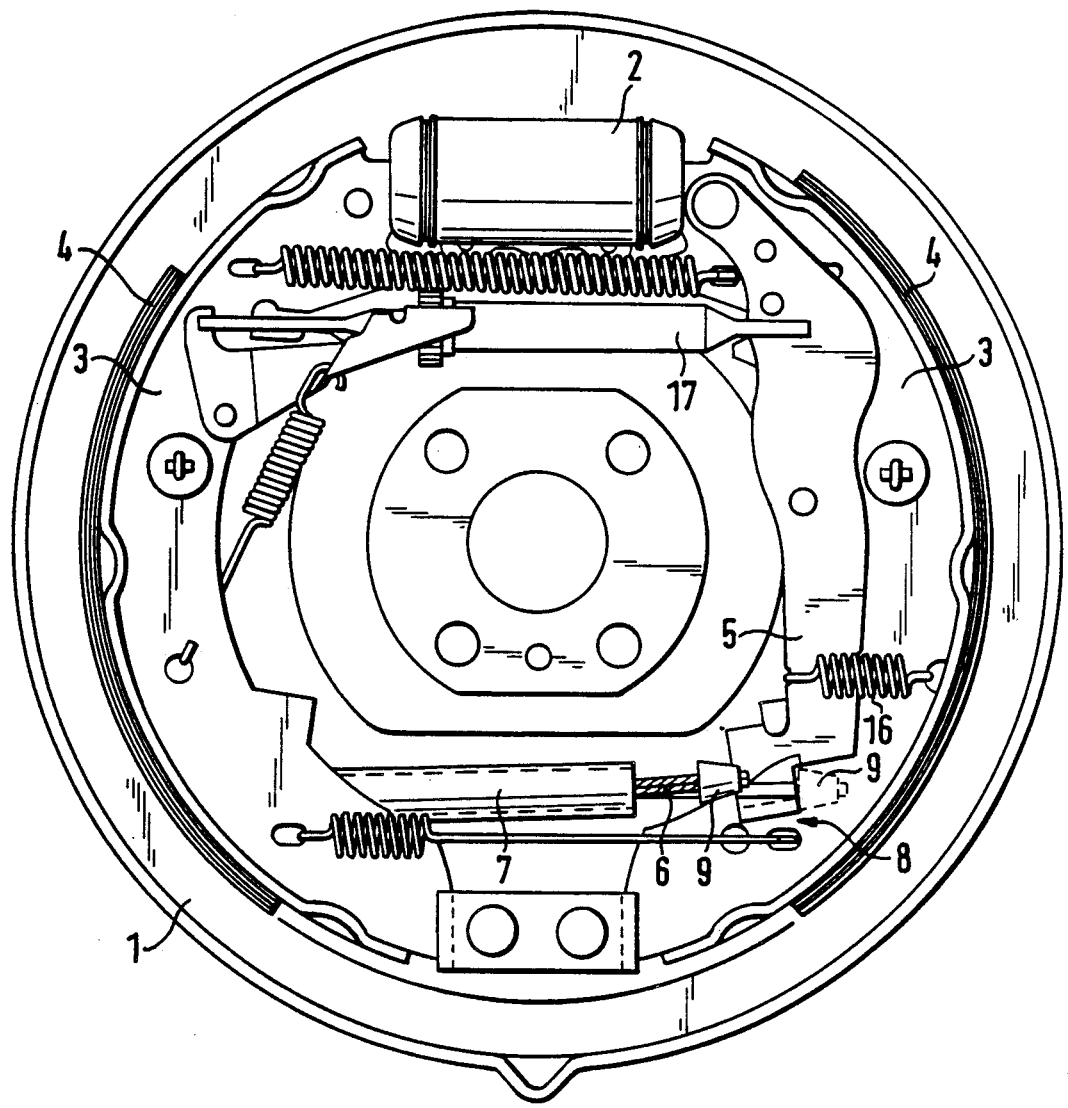
FIG. 1 is an elevation of an opened drum brake.

The drum brake illustrated in FIG. 1 comprises an anchor plate 1 to which a wheel brake cylinder 2 is fixed which pivots two brake shoes 3 away from each other, on actuation of the service brake, until the linings 4 of the brake shoes are pressed against a brake drum (not shown).

The right brake shoe 3 in FIG. 1 is connected in articulated fashion to a hand brake lever 5 which in turn is connected to the other brake shoe 3 by force transmitting links 17.

Details of the attachment of the brake cable 6 at the hand brake lever 5 will be now be described with reference to FIG.'S 2 through 4 which shows them on an enlarged scale. A guide tube 7 is fixed to the anchor plate 1 and leads at its outer end to the exterior of the drum and terminates at its inner end terminates at a distance from a retaining means 8 at the lower end of the hand brake lever 5. At the outer end, the guide tube 7 extends to the edge of the drum brake so that the brake cable 6 can be inserted from outside into the guide tube 7 when the drum brake is closed.

At its front end the brake cable 6 is provided with a frustoconical nipple 9 which is connected firmly to the brake cable 6. The smaller front end portion 14 of the nipple 9 is proximate the cable end.

The retaining means 8 for the brake cable 6 or more specifically the nipple 9 thereof consists of a lower edge portion of the hand brake lever 5 bent approximately into U shape, the marginal free edge 10 of the bent end portion rising upwardly and rearwardly like a ramp from the front face 11, facing the guide tube 7, to the rear face 12. At the backside of the retaining means 8 the marginal edge terminates in a locking hook 13.

Figure 3:
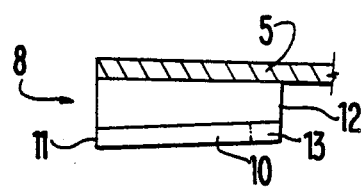
FIG. 3 is a broken horizontal cross sectional view taken substantially on the line 3—3 of FIG. 2.
Figure 4:
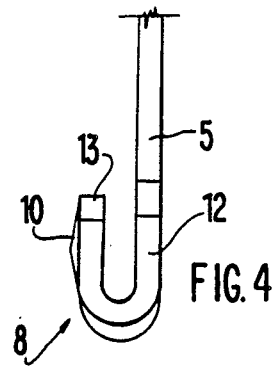
FIG. 4 is a broken vertical elevational view of a lower portion of the parking brake lever looking in the direction of the arrows 4—4 in FIG. 2.
Figure 2:
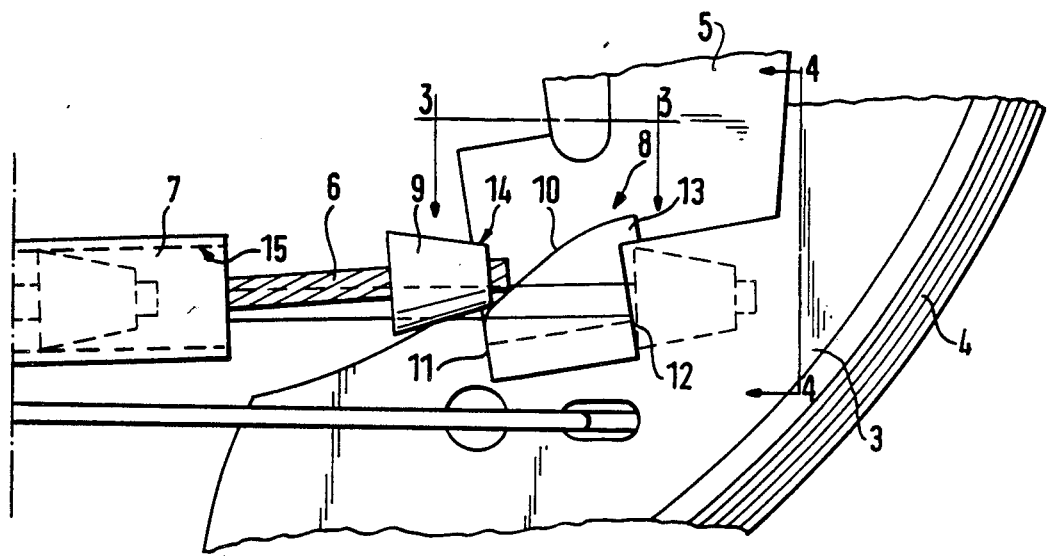
FIG. 2 is an enlarged presentation of the brake cable attachment shown in FIG. 1.

The guide tube 7 has an inner diameter which is slightly greater than the outer diameter of the nipple 9. The inner end of the guide tube 7 is spaced from the ramp-like marginal edge 10 such that as As the brake cable 6 with its nipple 9 is introduced from outside into the guide tube 7, with the drum brake closed, and advanced through the tube in the direction of the retaining means 8, the nipple 9 with its front portion 14 first enters into the wider dimensioned spacing from the lever 5 of the retaining means 8 at the front face 11 thereof, as best seen in FIG. 3, so as to become centered. Upon further pushing, the nipple 9 rides up the ramp-like marginal edge 10 while being deflected more and more in an upward direction as it moves toward the rear face 12. Before the nipple 9 reaches the rear face 12 of the retaining means 8, the brake cable 6 enters into engagement, at 15, with the upper inside surface 15 of the guide tube 7 so that the further advance of the nipple 9 generates a return force in the brake cable 6. When the rear face 12 of the retaining means 8 is reached this return force propels the nipple 9 downwardly into snap engagement in the position illustrated by discontinuous lines. This fixing position of the nipple 9 is secured by the locking hook 13 when the brake cable 6 is tight.

The tight condition of the brake cable 6 is assured by a tension spring 16 (FIG. 1) disposed between the hand brake lever 5 and the corresponding brake shoe 3.

What is claimed is:

1. A drum brake for a motor vehicle comprising a parking brake including a brake cable, a hand brake lever within the drum brake, retaining means carried by said hand brake lever, and a nipple of larger cross section than said retaining means and carried by the free end of said cable, said cable passing through said retaining means with said nipple engaging behind said retaining means to detachably connect said cable to said hand brake lever, said brake cable passing through a guide tube fixed to an anchor plate of the drum brake and leading at its outer end to the exterior of the drum brake and terminating at its inner end at a distance spaced from said retaining means, the inner diameter of said tube having sufficient clearance with respect to the maximum outer diameter of said nipple as to enable said nipple to pass through said tube when inward force is exerted on said cable, said retaining means comprising a lower end portion of the hand brake lever bent substantially into a U-shape in cross section, the free marginal upper edge of said bent end portion rising upwardly and rearwardly like a ramp from the front face, facing said guide tube, to the rear face of said retaining means, said rear face including locking means for said nipple when the latter is engaged behind said rear face, said inner end of said guide tube being spaced from said ramp-like marginal edge a distance such that said nipple on being advanced through said guide tube engages the front end of said ramp-like marginal edge and runs up on said edge as said nipple continues to be advanced, said ramp-like marginal edge of said bent portion rising by such a degree that in the course of the advance of said nipple on said marginal edge, said brake cable is pressed against the upper inside surface of said guide tube until said nipple drops off the rear end of said marginal edge and behind the rear face of said retaining means.

2. The drum brake as claimed in claim 1, characterized in that the spacing of the bent end portion from the lever diminishes from the front face (11) to the rear face (12) thereof.

3. The drum brake as claimed in claim 1, characterized in that the nipple (9) is embodied by a frustum of a cone having its smaller cross sectional area proximate the end of the brake cable (6).

4. The drum brake as claimed in claim 1, characterized in that the ramp-like marginal edge (10) terminates in a rear locking hook (13) which constitutes the locking means for the nipple (9).

5. The drum brake of claim 1 wherein the front end portion of said nipple has a smaller cross sectional area than the rear end portion thereof and wherein the spacing between said marginal edge of said bent end portion and said lever is dimensioned such that the corresponding front end portion of the nipple can at first enter into said spacing while the nipple, on being advanced, runs up on said ramplike marginal edge.

6. The drum brake as claimed in claim 1 including a brake shoe within said drum brake operatively associated with said hand brake lever, and a spring for maintaining said brake cable taut inserted under tension between said hand brake lever and said associated brake shoe.

* * * * *